United States Patent
Ahn

(10) Patent No.: US 9,380,212 B2
(45) Date of Patent: Jun. 28, 2016

(54) CAMERA MODULE

(71) Applicant: LG INNOTEK CO., LTD., Seoul (KR)

(72) Inventor: Jae Wook Ahn, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/411,370

(22) PCT Filed: Jan. 29, 2013

(86) PCT No.: PCT/KR2013/000698
§ 371 (c)(1),
(2) Date: Dec. 24, 2014

(87) PCT Pub. No.: WO2014/003281
PCT Pub. Date: Jan. 3, 2014

(65) Prior Publication Data
US 2015/0138381 A1 May 21, 2015

(30) Foreign Application Priority Data
Jun. 29, 2012 (KR) .................. 10-2012-0071003

(51) Int. Cl.
*H04N 5/232* (2006.01)
*G02B 27/64* (2006.01)
*G03B 5/00* (2006.01)
*H04N 5/225* (2006.01)

(52) U.S. Cl.
CPC ............ *H04N 5/2328* (2013.01); *G02B 27/646* (2013.01); *G03B 5/00* (2013.01); *H04N 5/2253* (2013.01); *H04N 5/2254* (2013.01); *H04N 5/2257* (2013.01); *H04N 5/23258* (2013.01); *H04N 5/23287* (2013.01); *G03B 2205/0023* (2013.01); *G03B 2205/0069* (2013.01)

(58) Field of Classification Search
CPC ............ H04N 5/2328; H04N 5/23258; H04N 5/2253; H04N 5/2257; H04N 5/23287; H04N 5/2254; H04N 5/23248; G02B 27/646; G03B 5/00; G03B 2205/0069; G03B 2205/0023
See application file for complete search history.

(56) References Cited

U.S. PATENT DOCUMENTS

| 7,912,361 | B2 * | 3/2011 | Lim | ............... G02B 27/646 348/208.11 |
| 7,944,629 | B2 * | 5/2011 | Shin | ............... G02B 7/023 359/811 |
| 7,983,545 | B2 * | 7/2011 | Maeda | ............... G03B 17/00 348/208.11 |

(Continued)

FOREIGN PATENT DOCUMENTS

| JP | 2010-152182 A | 7/2010 |
| KR | 10-2010-0093263 A | 8/2010 |
| KR | 10-2011-0080590 A | 7/2011 |
| KR | 10-2011-0106664 A | 9/2011 |

OTHER PUBLICATIONS

International Search Report dated May 15, 2013 issued in Application No. PCT/KR2013/000698.

*Primary Examiner* — Luong T Nguyen
(74) *Attorney, Agent, or Firm* — KED & Associates LLP

(57) ABSTRACT

An exemplary embodiment of the present invention may include a first board mounted with an image sensor, a first holder coupled to an upper surface of the first board, a second holder arranged at an upper surface of the first holder and mounted at a periphery with a plurality of magnets, a first elastic member supporting the second holder, and a ball guide unit interposed between the first holder and the second holder.

20 Claims, 4 Drawing Sheets

(56) References Cited

U.S. PATENT DOCUMENTS

| | | | | |
|---|---|---|---|---|
| 2008/0187301 A1* | 8/2008 | Takahashi | | G03B 5/00 396/55 |
| 2009/0303594 A1 | 12/2009 | Lim et al. | | 359/554 |
| 2011/0096178 A1* | 4/2011 | Ryu | | H04N 5/2252 348/208.2 |

* cited by examiner

CAMERA MODULE

CROSS-REFERENCE TO RELATED PATENT APPLCATIONS

This application is a U.S. National Stage Application under 35 U.S.C. §317 of PCT Application No. PCT/KR2013/000698, filed Jan. 29, 2013, which claims priority to Korean Patent Application No. 10-2012-0071003, filed Jun. 29, 2012, whose entire disclosures are hereby incorporated reference.

TECHNICAL FIELD

The teachings in accordance with exemplary and non-limiting embodiments of this invention relate generally to a camera module.

BACKGROUND ART

The recent trend is that camera modules used for electronic devices are mounted with various hand-shake correction schemes automatically compensating an image instability caused by camera shake, that is, vibration of a camera apparatus typically caused by user hand, in addition to auto-focusing automatically adjusting an image focus.

The hand-shake correction scheme is a function of minimizing image instability or error caused by handshake by controlling an actuator to a direction opposite to movement of an image captured by an image sensor, in a case the image captured on the image sensor is shaken by a user hand, an external shock or a vibration.

As one of representative prior art capable of realizing a handshake prevention function, Korean Patent Application No. 10-2010-0952620, registered on Apr. 6, 2010, discloses a camera module provided with a suspension-type handshake prevention actuator in which a plurality of wires coupled at one side to a cover of a camera module, and coupled at the other side to a bobbin, is provided to compensate the handshake by interaction between an electromagnet installed at a periphery of the bobbin and a magnet arranged at a position opposite to the electromagnet inside the cover.

DISCLOSURE

Technical Problem

Accordingly, it is an object of the present invention to provide an actuator-mounted, structurally improved camera module capable of being configured in a simple structure with an inexpensive cost.

Technical Solution

In order to accomplish the above object, in one general aspect of the present invention, there is provided a camera module, the camera module comprising: a first board mounted with an image sensor; a first holder coupled to an upper surface of the first board; a second holder arranged at an upper surface of the first holder and mounted at a periphery with a plurality of magnets; a first elastic member supporting the second holder; and a ball guide unit interposed between the first holder and the second holder.

Preferably, but not necessarily, the first elastic member may elastically support reciprocating and tilting movements of the second holder.

Preferably, but not necessarily, the camera module may further comprise a lens barrel unit mounted at the second holder.

Preferably, but not necessarily, the lens barrel unit may include a lens barrel mounted with at least one or more sheets of lenses, and a coil unit arranged at a periphery of the lens barrel.

Preferably, but not necessarily, the ball guide unit may include a first ball guide unit mounted at the first holder to contact a surface opposite to the second holder.

Preferably, but not necessarily, the ball guide unit may include a second ball guide unit mounted at the second holder to contact a surface opposite to the first holder.

Preferably, but not necessarily, the first holder and the second holder may include a first inclined plane and a second inclined plane each having a different tilt angle at a periphery faced by the first and second inclined planes, and the first and second ball guide units are respectively installed at the first and second inclined planes.

Preferably, but not necessarily, each of the first and second ball guide units may be provided in a plural number, and each of the first and second ball guide units may be alternatively arranged and each being discrete from the other at a predetermined interval.

Preferably, but not necessarily, the first holder may include a first through hole that is centrally and penetratively formed, and a board accommodation unit protruded from an inner surface of the first through hole to support the first board.

Preferably, but not necessarily, the second holder may include a plurality of magnets vertically arranged at an inner surface with an N pole and an S pole, and a second through hole that is centrally and penetratively formed and mounted with the lens barrel unit.

Preferably, but not necessarily, the camera module may further comprise: a first inclined plane formed at a surface opposite to the second holder of the first holder to have a first tilt angle; and a second inclined plane formed at a surface opposite to the first inclined plane of the second holder to have a second tilt angle.

Preferably, but not necessarily, the second tilt angle may be formed greater than the first tilt angle.

Preferably, but not necessarily, the second tilt angle may be formed smaller than the first tilt angle.

Preferably, but not necessarily, the second tilt angle may be formed same as the first tilt angle.

Preferably, but not necessarily, the lens barrel may include at an upper surface of the lens barrel a second elastic member elastically supporting a reciprocating movement of the lens barrel.

Preferably, but not necessarily, the camera module may further comprise a shield can so installed as to encompass the first and second holders for performing an electromagnetic wave shielding function.

Preferably, but not necessarily, the lens barrel may include a plurality of lenses, where at least one of the lenses is a variable lens.

Preferably, but not necessarily, the variable lens may be arranged at any one place of an upper surface and a bottom surface of the lens barrel.

Preferably, but not necessarily, tilting and shifting operations of the first and second holders relative to an optical axis may be carried out through the first and second ball guide units.

Preferably, but not necessarily, the first ball guide unit may include a first ball member installed on the first holder and a first ball guide preventing the first ball member from being disengaged, and the second ball guide unit may include a second ball member installed at the second holder and a second ball guide preventing the second ball member from being disengaged.

Preferably, but not necessarily, the first and second ball guides may be so configured as to grip both distal ends of the first and second ball members to allow the ball member to roll to a predetermined direction or to all directions.

Preferably, but not necessarily, the camera module may further comprise a detection sensor detecting movement of the first holder.

Preferably, but not necessarily, the detection sensor may be positioned at the first holder.

Advantageous Effects

A camera module according to an exemplary embodiment of the present invention has an advantageous effect in that a plurality of first and second ball guide units are interposed between a first holder coupled to a PCB and a second holder having a lens barrel unit to allow the second holder to move to a tilting and shifting directions relative to an image sensor surface, whereby handshake can be more accurately compensated.

BEST MODE

Now, the camera module according to exemplary embodiments of the present invention will be described in detail with reference to the accompanying drawings.

Figure 1:
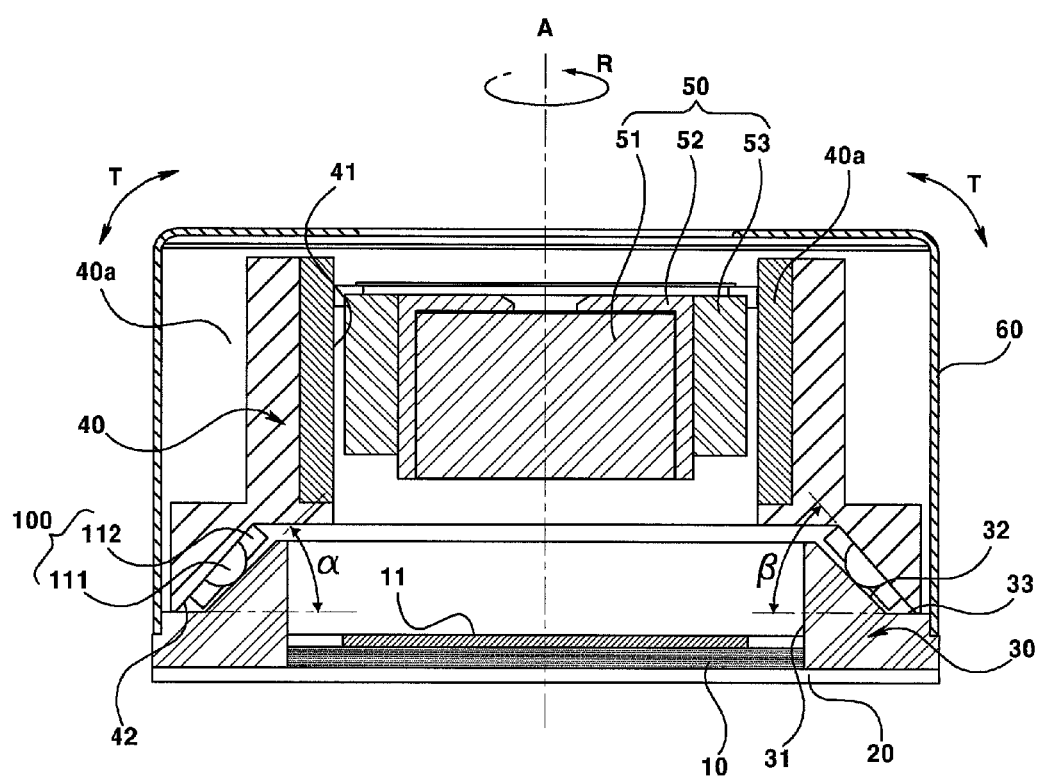
FIG. 1 is a cross-sectional view illustrating a camera module according to an exemplary embodiment of the present invention.
Figure 2:
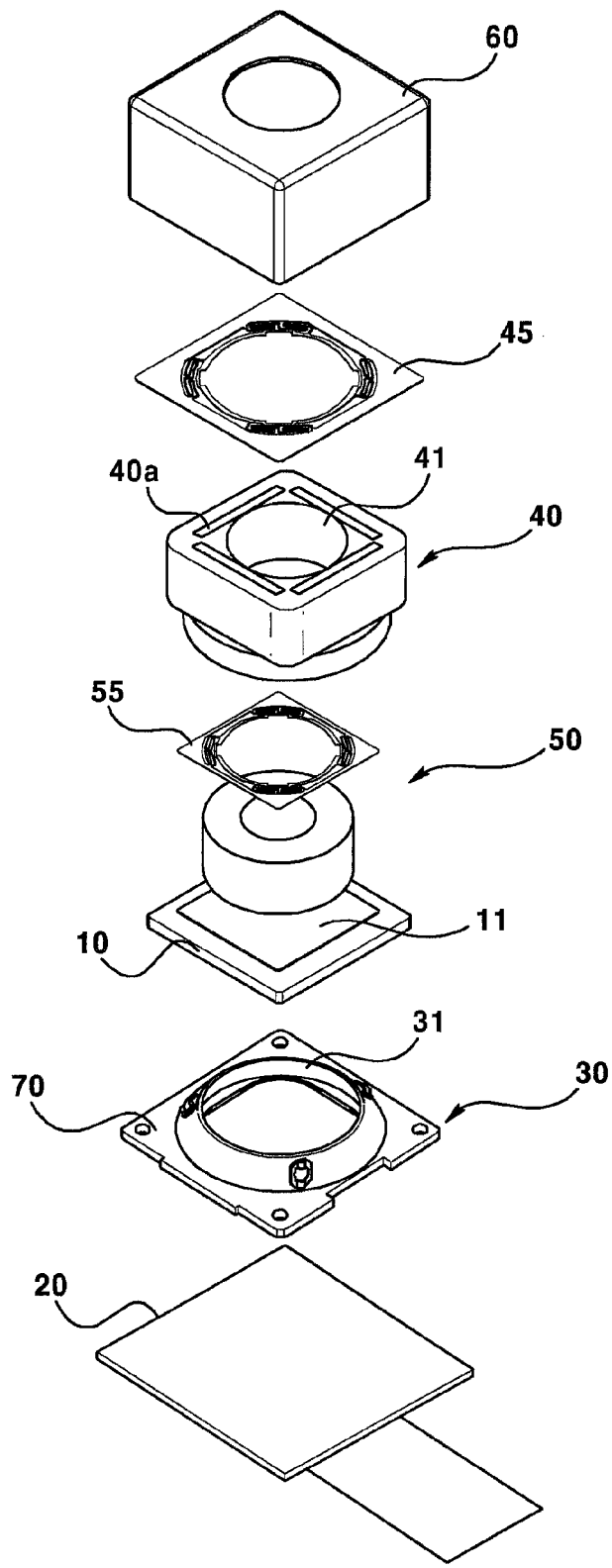
FIG. 2 is an exploded perspective view of FIG. 1.
Figure 3:
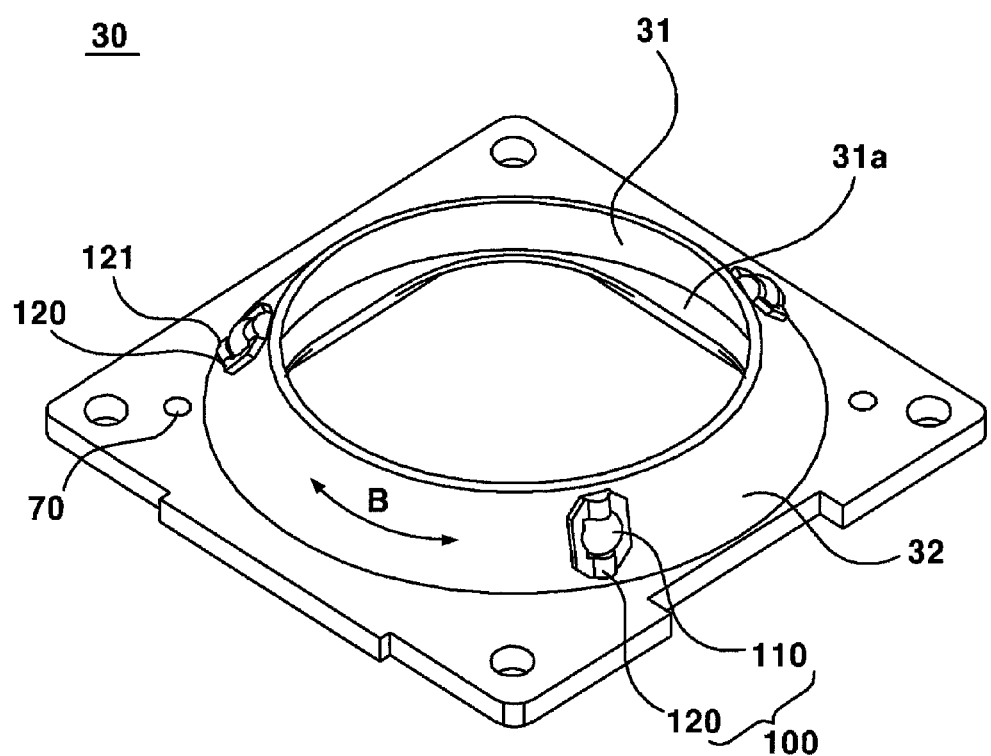
FIG. 3 is a perspective view of a first holder.
Figure 4:
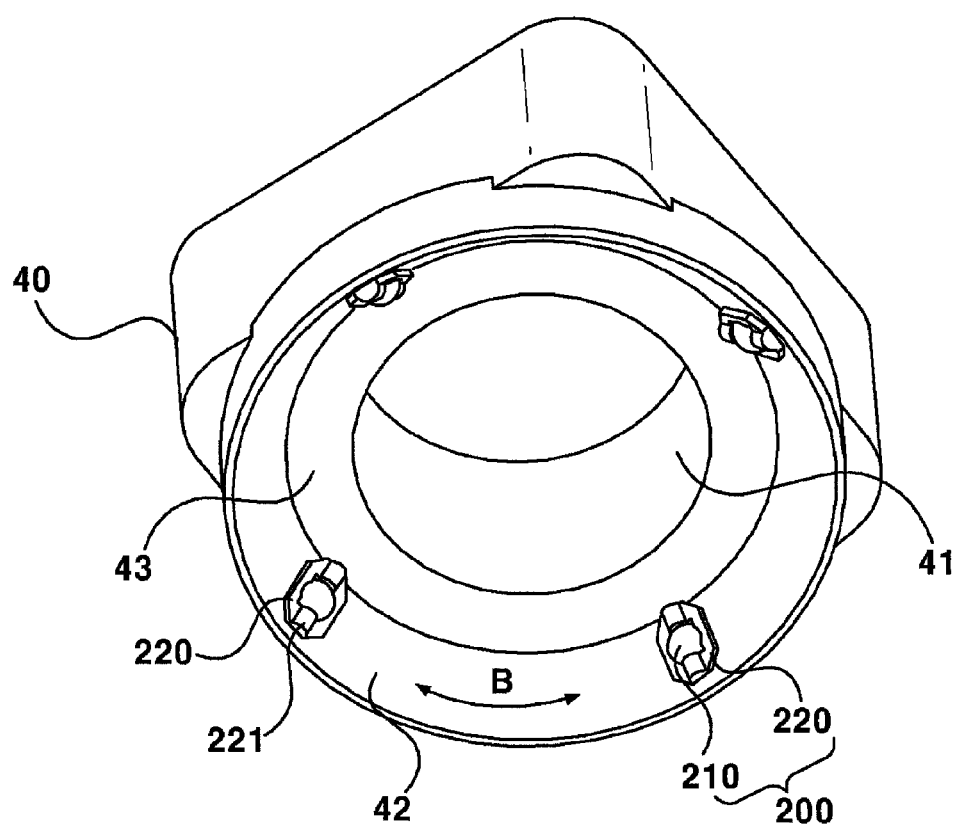
FIG. 4 is a perspective of a rear surface of a second holder.

FIG. 1 is a cross-sectional view illustrating a camera module according to an exemplary embodiment of the present invention, FIG. 2 is an exploded perspective view of FIG. 1, FIG. 3 is a perspective view of a first holder, and FIG. 4 is a perspective of a rear surface of a second holder.

Referring to FIG. 1, a camera module according to an exemplary embodiment of the present invention may include a first board (10), a second board (20), a lens barrel unit (50), a shield can (60), a first ball guide unit (100) and a second ball guide unit (200, see FIG. 4).

The first board (10) may be mounted near a center thereof with an image sensor (11) and may be mounted with a plurality of electronic parts for operating the image sensor (11). The second board (20) may be mounted at a floor surface side of the first board (10) to be conductibly connected to the first board (10). The second board (20) may receive image information read out from the image sensor (11) and output the information to a predetermined controller (not shown). The second board may be formed in an F-PCB (Flexible Printed Circuit Board). However, the present invention is not limited thereto, and other various types of boards may be used as necessary.

Preferably, the first holder (30) is formed with a penetratively-formed first through hole (31) to allow centrally arranging the first board (10), the first through hole (31) may be preferably formed in a cylindrical shape having a diameter greater than a width of the first board (10), and a board accommodation unit (31a) may be formed at a position accommodated by the first board (10) as illustrated in FIG. 3.

The board accommodation unit (31a) may be protrusively formed from an inner surface of the first through hole (31), where at least a total of four (4) board accommodation units (31a) may be formed on at least four (4) positions of the inner surface of the first through hole (31).

Furthermore, albeit not being illustrated, the first board (10) may be installed at a floor surface side of the first holder (30), as the first holder (30) is fixed in position thereof along with the first board (10).

A first inclined plane (32) may be formed at a periphery of the first holder (30), where a tilt angle of the first inclined plane (32) may be a first angle (a) based on an imaginary line parallel with the first board (10). The first inclined plane (32) may take a shape of a cone formed with an opening at an upper surface as illustrated in FIGS. 2 and 3. Furthermore, a periphery of the first holder (30), where the first inclined plane (32) ends, may be formed with a support surface (33) parallel with the first board (10). The first inclined plane (32) may be arranged with a plurality of first ball guide units (100), each space apart at a predetermined distance. The first ball guide unit (100) will be described in detail with regard to its configuration.

The second holder (40) may include a plurality of magnets (40a) vertically arranged at an inner surface with an N pole and an S pole, and according to an exemplary embodiment of the present invention, the second holder (40) may take a shape of a square at a cross-section at an area, where the magnets (40a) are arranged, and may be arranged at an inner surface with four pairs of magnets (40a). At this time, each polarity of the magnets (40a) may be the same. By way of non-limiting example, in a case a magnet (40a) is upwardly arranged with an N pole on the drawing, each of the other magnets (40a) may be arranged with an N pole at an upper surface. The second holder (40) may be centrally formed with a second through hole (41) mounted with a lens barrel unit (50), where the second through hole (41) may take a shape of a cylinder.

Meanwhile, a second inclined plane (42) corresponding to the first inclined plane (32) may be formed at a surface opposite to the first holder (30) of the second holder (40). Each angle of the first and second inclined planes (32, 42) may be same or different. At this time, as illustrated in FIG. 4, a bottom surface of the second holder (40) formed with the second inclined plane (42) may be formed with a cylindrical shape having a diameter greater than an upper opening of the first inclined plane (32) but smaller than a maximum width of the first holder (30), where an inner surface may be provided with a shape of a cone having the second inclined plane (42).

The second inclined plane (42) may be provided with a second ball guide unit (200) contacting the first inclined plane (32) at a position not interfering the first ball guide unit (100). The second ball guide unit (200) will be described in detail with regard to its configuration.

A tilt angle of the second inclined plane (42) may be a second angle (β) based on an imaginary line parallel with the first board (10). The second angle (β) may have a different value as that of the first angle (α), and according to an exemplary embodiment of the present invention, the second angle (β) may be formed greater than the first angle (α). However, the present invention is not limited thereto, and the second angle (β) and the first angle (α) may be same in size or the second angle (β) may be formed smaller than the first angle (α), if necessary. According to this configuration, the second holder (40) may carry out a tilting movement to an arrow T direction of FIG. 1 at an upper surface of the first holder (30). Albeit not being illustrated, the second angle (β) may be formed smaller than the first angle (α). Alternatively, the first and second angles (α,β) may be of same size. Meanwhile, a floor surface (43) parallel with the first board (10) may be formed between the second inclined plane (42) and the second through hole (41), where the second inclined plane (42) may be protruded from the floor surface (43) to a direction facing the first board (10).

Referring to FIG. 2, the second holder (40) may be provided at an upper surface with a first elastic member (45) to elastically support the movement of the second holder (40). In a case the first elastic member (45) is provided, the second holder (40) can return to its initial position even if the second holder (40) vertically reciprocates as in FIG. 1 or tilting and shifting movements are generated between the first and second inclined planes (32, 42).

Meanwhile, in order to control the vertical movement of the second holder (40), albeit not being illustrated, there is a need of installing a separate case coil unit (not shown) at an inner surface of the shield can (60) interacting with the magnet (40a) mounted at the second holder (40). In this case, a coil unit (53) may be omitted from a position corresponding to that of the magnet (40a) of a lens barrel (52, described later).

The first elastic member (45) may be provided in various configurations, but may be provided in a shape of a metal plate having a predetermined pattern as illustrated in FIG. 2. According to this configuration, it is possible to be supplied with a power through the first elastic member (45), if necessary.

The lens barrel unit (50) may include therein a lens barrel (52) mounted with at least one or more sheets of lenses, and a coil unit (53) arranged at a periphery of the lens barrel (52) to perform an electromagnetic interaction with the magnet (40a). According to this configuration, the lens barrel unit (50) can vertically reciprocate as shown in FIG. 1, in response to an interaction with the magnet (40a) to automatically adjust a focus of an image captured on the image sensor (11). The lens barrel (52) may be configured to have a diameter a little smaller than that of the second through hole (41), and may be provided with a second elastic member (55) elastically supporting the lens barrel (52) relative to the reciprocating movement. The second elastic member (55) may be formed with a plate member of metal material with a predetermined pattern as that of the first elastic member (45).

The lens barrel (52) may be injection molded with plastic, and albeit not being illustrated, an extreme outer lens positioned at an upper surface or a bottom surface of the lens barrel (52) may be configured with a variable lens, where the extreme outer lens may be liftably controlled to realize the auto focusing function. Furthermore, this configuration may be selectively applied to any one of the plurality of lenses (51) mounted inside the lens barrel (52), where a lens in the center or an extreme rear end lens may be used as a variable lens to realize the auto focusing function. If the lens barrel (52) is mounted with a variable lens to realize the auto focusing function as noted above, the lens barrel (52) may maintain a state of being fixed to the second holder (40). The shield can (60) serves to form an exterior look of the camera module, and may perform an electromagnetic wave shielding function by being configured with a metal material.

Referring to FIG. 3, the support surface (33) provided at the first holder (30) may be mounted with at least one more detection sensors (70). The detection sensor (70) may be any type of sensor as long as it can detect a movement of the first and second holders (30, 40) including magnetic sensors such as a Hall sensor and the like. The detection sensor (70) may be installed at various positions including an inner side of the shield can (60), in addition to the first holder (30).

Meanwhile, the first and second ball guide units (100, 200) may be provided to guide lifting, tilting and/or shifting operations between the first and second holders (30, 40) of the camera module thus configured. At this time, the tilting and/or shifting operations between the first and second holders (30, 40) may be formed by electromagnetic interaction between the magnet (40a) mounted at the second holder (40) and a coil module (not shown). At this time, the coil module may be installed at a surface of the first holder (30) or inside the first holder (30), where the coil module with a fine pattern in a state of fine wound coil may operate as an electromagnet by receiving a power. Thus, in a case the coil module is supplied with the power to generate an electromagnetic interaction with the magnet (40a), a tilt angel of the second holder (40) may be adjusted in response to current applied to the plurality of coil modules.

The handshake compensation of an image captured on the image sensor (11) can be performed by tilt-control of the second holder (40) in response to the electromagnetic interaction between the coil module and the magnet (40a). That is, this is because the shift-control of the second holder (40) allows moving the lens barrel (52) centrally formed on the second holder (40) in conjunction with the shifting movement of the second holder (40), and an optical axis passing the lens barrel (52) is adjusted. Furthermore, the coil module may be also provided on the first board (10) in addition to a surface opposite to the magnet (40a) of the first holder (30).

Preferably, the first and second ball guide units (100, 200) are provided in the same structure, where the first and second ball guide units (100, 200) may be configured by first and second ball members (110, 210) and first and second ball guides (120, 220).

Referring to FIGS. 3 and 4, the first and second ball members (1101, 210), each of a sphere shape, may be provided in plural number on the first inclined plane (32) of the first holder (30) and the second inclined plane (42) of the second holder (40). That is, the first ball member (110) may be arranged on the first inclined plane (32) to be brought into contact with the second inclined plane (42), and perform a rolling operation in a state of being prevented from being disengaged by the first ball guide (120). Furthermore, the second ball member (210) may be arranged on the second inclined plane (42) to be brought into contact with the first inclined plane (32), and perform a rolling operation in a state of being prevented from being disengaged by the second ball guide (120).

Meanwhile, the first and second ball guide units (100, 200) may be alternatively formed on the first and second inclined planes (32, 42) at mutually alternating positions, whereby the first and second ball guide units (100, 200) are not mutually interfered to allow the first ball guide unit (100) to perform a rolling operation on the second inclined plane (42) and to allow the second ball guide unit (200) to perform a rolling operation on the first inclined plane (32).

Furthermore, at least one or more plural numbers of first and second ball guide units (100, 200) are preferably provided, and two or more first and second ball guide units (100, 200) may be provided if necessary. By way of non-limiting example, as illustrated in FIGS. 3 and 4, three (3) first ball guide units (100) may be arranged each at equidistance, and four (4) second ball guide units (200) may be alternatively arranged at alternating positions from those of the first ball guide units (100) each at equidistance. In a case the first and second ball guide units (100, 200) are arranged thus configured, an inner angle between imaginary extension lines connecting a center of the first ball member (110) and a center of the first holder (30) in the first ball guide unit (100) may be 120°, and an inner angle between imaginary extension lines connecting a center of the second ball member (210) and a center of the second holder (40) in the second ball guide unit (200) may be 90°.

Meanwhile, the first and second ball members (110, 210) are provided each in a spherical shape, a surface contact with a surface opposite to the first and second inclined planes (32, 42) can minimize the frictional force interfering the rolling operations of the first and second ball members (110, 210).

The first and second ball guides (120, 220) may serve to prevent the first and second ball members (110, 210) from being disengaged from the first and second inclined planes (32, 42) and to guide the rolling operations of the first and second ball members (110, 210). Referring to FIGS. 3 and 4 again, the first and second ball guides (120, 220) may be provided with first and second grip units (121, 221) griping each lateral surface of the first and second ball members (110, 210) to allow both lateral surfaces, where the first and second ball guides (120, 220) and the first and second ball members (110, 210) are meshed, to be rotation shafts, or to perform the rolling operations to all directions.

According to the abovementioned configuration, the first and second holders (30, 40) may allow the rolling operations between the first and second inclined planes (32, 42) to be smoothly realized through the first and second ball guide units (100, 200).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

Industrial Applicability

The camera module according to exemplary embodiments of the present invention has an industrial applicability in that it can be applied to a camera module mounted at small electronic devices such as a mobile terminal and a tablet PC.

The invention claimed is:

1. A camera module, the camera module comprising:
a first board mounted with an image sensor;
the image sensor disposed on an upper surface of the first board;
a first holder disposed at the first board;
a second holder disposed at an upper surface of the first holder;
a first elastic member supporting the second holder;
a ball guide unit disposed between the first holder and the second holder; and
an inclined plane inclined relative to an upper surface of the image sensor and formed on at least one of the first holder and the second holder,
wherein the ball guide unit is disposed on the inclined plane,
wherein the inclined plane includes a first inclined plane formed on the first holder and having a first tilt angle, and a second inclined plane formed on the second holder and having a second tilt angle.

2. The camera module of claim 1, wherein the first elastic member elastically supports reciprocating and tilting movements of the second holder.

3. The camera module of claim 1, further comprising:
a lens barrel unit disposed at an inner side of the second holder;
a second elastic member coupled to the second holder and the lens barrel unit.

4. The camera module of claim 3, wherein the lens barrel unit includes a lens barrel mounted with at least one lens, and a first driving unit disposed at the lens barrel, and
wherein a second driving unit is disposed at the second holder, and the second driving unit is configured to perform an electromagnetic interaction with the first driving unit.

5. The camera module of claim 1, wherein the ball guide unit includes a first ball guide unit mounted at the first holder to contact the second inclined plane, and a second ball guide unit mounted at the second holder to contact the first inclined plane.

6. The camera module of claim 5, wherein each of the first and second ball guide units is provided in a plural number, and each of the first and second ball guide units is alternatively arranged and each being discrete from the other.

7. The camera module of claim 1, wherein the first holder includes a first through hole that is centrally and penetratively formed, and a board accommodation unit protruded from an inner surface of the first through hole to support the first board.

8. The camera module of claim 4, wherein the second driving unit includes a plurality of magnets vertically arranged at an inner surface with an N pole and an S pole, and
wherein the second holder includes a second through hole that is centrally and penetratively formed and mounted with the lens barrel unit.

9. The camera module of claim 1, wherein the second tilt angle is greater than the first tilt angle.

10. The camera module of claim 1, wherein the second tilt angle is smaller than the first tilt angle.

11. The camera module of claim 1, wherein the second tilt angle is same as the first tilt angle.

12. The camera module of claim 2, wherein the second elastic member elastically supports a reciprocating movement of the lens barrel.

13. The camera module of claim 1, further comprising a shield installed to encompass the first and second holders for performing an electromagnetic wave shielding function.

14. The camera module of claim 4, wherein the lens barrel includes a plurality of lenses, wherein at least one of the lenses is a variable lens.

15. The camera module of claim 14, wherein the variable lens is arranged at any one of an upper surface and a bottom surface of the lens barrel.

16. The camera module of claim 5, wherein tilting and shifting operations of the first and second holders relative to an optical axis are carried out through the first and second ball guide units.

17. The camera module of claim 5, wherein the first ball guide unit includes a first ball member installed on the first holder and a first ball guide preventing the first ball member from being disengaged, and the second ball guide unit includes a second ball member installed at the second holder and a second ball guide preventing the second ball member from being disengaged.

18. The camera module of claim 17, wherein the first and second ball guides are configured to grip both distal ends of the first and second ball members to allow the ball member to roll to a predetermined direction or to all directions.

19. The camera module of claim 1, further comprising a detection sensor detecting movement of the first holder.

20. The camera module of claim 19, wherein the detection sensor is positioned at the first holder.

* * * * *